(12) United States Patent
Ozaki et al.

(10) Patent No.: US 10,175,111 B2
(45) Date of Patent: Jan. 8, 2019

(54) METHOD AND APPARATUS FOR CHARACTERIZATION OF TERAHERTZ RADIATION

(71) Applicant: INSTITUT NATIONAL DE LA RECHERCHE SCIENTIFIQUE, Quebec (CA)

(72) Inventors: Tsuneyuki Ozaki, Brossard (CA); Gargi Sharma, Brampton (CA); Kanwarpal Singh, Brampton (CA)

(73) Assignee: Institut National de la Recherche Scientifique, Quebec (CA)

( * ) Notice: Subject to any disclaimer, the term of this patent is extended or adjusted under 35 U.S.C. 154(b) by 136 days.

(21) Appl. No.: 15/524,488

(22) PCT Filed: Nov. 4, 2015

(86) PCT No.: PCT/CA2015/051133
§ 371 (c)(1),
(2) Date: May 4, 2017

(87) PCT Pub. No.: WO2016/070273
PCT Pub. Date: May 12, 2016

(65) Prior Publication Data
US 2017/0336262 A1 Nov. 23, 2017

Related U.S. Application Data

(60) Provisional application No. 62/076,826, filed on Nov. 7, 2014.

(51) Int. Cl.
*G01J 5/02* (2006.01)
*G01J 3/42* (2006.01)
*G01J 3/02* (2006.01)

(52) U.S. Cl.
CPC ............... *G01J 3/42* (2013.01); *G01J 3/0218* (2013.01); *G01J 3/0224* (2013.01)

(58) Field of Classification Search
CPC .... G01J 3/453; G01J 3/02; G01N 2021/3595; G01N 21/3563; G01N 21/35
See application file for complete search history.

(56) References Cited

U.S. PATENT DOCUMENTS

| 6,111,416 A | 8/2000 | Zhang et al. |
| 6,844,552 B2 | 1/2005 | Zhang et al. |

(Continued)

FOREIGN PATENT DOCUMENTS

WO 201419091 2/2014

OTHER PUBLICATIONS

Verghese et al. "Highly Tunable Fiber-Coupled Photomixers with Coherent Terahertz Output Power" IEEE Transactions on Microwave Theory and Techniques, vol. 45, No. 8, Aug. 1997, p. 1301-1309.*

(Continued)

*Primary Examiner* — David Porta
*Assistant Examiner* — Mamadou Faye
(74) *Attorney, Agent, or Firm* — Gwendoline Bruneau

(57) ABSTRACT

A method for characterizing terahertz radiation using spectral domain interferometry, comprising overlapping a pump beam and a terahertz beam in a detecting crystal; obtaining two probe pulses by propagating the probe beam into a polarization maintaining single-mode optical fiber after the detecting crystal; and measuring a change in the optical path difference between the two probe pulses. The system comprises a detection crystal, where a terahertz pulse and a probe beam are made to overlap; a polarization-maintaining optical fiber propagating the probe beam after the detection (Continued)

crystal and outputting two probe pulses; and a spectrometer where the two probe pulses interfere.

20 Claims, 6 Drawing Sheets

(56) References Cited

U.S. PATENT DOCUMENTS

| | | | |
|---|---|---|---|
| 7,965,440 | B2 | 6/2011 | Holzworth et al. |
| 8,619,355 | B2 | 12/2013 | Holzworth et al. |
| 9,335,213 | B2 * | 5/2016 | Sharma .................... G01J 11/00 |
| 2008/0117940 | A1 * | 5/2008 | Tang ........................ H01S 3/067 372/6 |
| 2009/0066948 | A1 | 3/2009 | Karpowicz et al. |
| 2013/0146768 | A1 | 6/2013 | Sekiguchi et al. |
| 2016/0118765 | A1 * | 4/2016 | Huber ................. H01S 3/06758 372/6 |
| 2016/0315716 | A1 * | 10/2016 | Strong ............... G01N 21/3586 |

OTHER PUBLICATIONS

Karpowicz et al., Comparison between pulsed teraherts time-domain imaging and continuous wave terahertz imaging,Semicond. Sci. Technol. 20 (2005), S293-S299,Institute of Physics Publishing Ltd, UK.

B.B. Hu and M.G. Nuss, Imaging with Terahertz Waves, Optics Letters, vol. 20, No. 16, Aug. 15, 1995, pp. 1716-1718, Optical Society of America.

Kono et al., Detection of up to 20 THz with a low-temperature-grown GaAs photoconductive antenna gated with 15 fs light pulses, Applied Physics Letters, vol. 77, No. 25, Dec. 18, 2000, pp. 4104-4106.

Xiaofei Lu and X.-C, Zhang, Balance terahertz wave air-based-coherent-detection, Applied Science Letters, Apr. 14, 2011.

Sharma et al., Terahertz Detection Using Spectral Domain Interferometry, Optics Letters, vol. 37, No. 20, Oct. 15, 2012, pp. 4338-4340, Optical Society of America.

Sahrma et al., Self-referenced Spectral Domain Interferometry for Improved Signal-to-noise Measurement of Terahertz Radiation, Optics Letters, Aug. 1, 2013, vol. 38, No. 15, pp. 2705-2707, Optical Society of America.

Q. Wu and X.-C.Zhang, Free-space Electro-optic Sampling of Terahertz Beams, Appl. Phys. Lett. 67 (24), Dec. 11, 1995, pp. 3523-3525, American Institute of Physics.

Zhiping Jian and X.-C. Zhang, Single-shot Spatiotemporal Terahertz Field Imaging, Optics Letters, vol. 23, No. 14, Jul. 15, 1998, pp. 1114-1116, Optical Society of America.

Jamison et al., High-temporal-resolution, Single-shot Characterization of Terahertz Pulses, Optics Letters, vol. 28, No. 18, Sep. 15, 2003, pp. 1710-1712, Optical Society of America.

Kim et al., Single-shot Terahertz Pulse Characterization via Two-dimentional Electro-optic Imaging With Dual Echelons, Optics Letters, vol. 32, No. 14, Jul. 15, 2007, pp. 1968-1970, Optical Society of America.

Kawada et al., Real-time Measure of temporal Waveforms of a Terahertz pulse Using a Probe Pulse with a tilted Pulse Front, Optics Letters, vol. 33, No. 2, Jan. 15, 2008, pp. 180-182, Optical Society of America.

Fletcher, Distortion and Uncertainty in Chirped Pulse THz Spectrometers, Optics Express, vol. 10, No. 24, Dec. 2, 2002, pp. 1425-1430, Optics Society of America.

Zhang et al., High-dynamic-range Quantitative Phase Imaging With Spectral Domain Phase Microscopy, Optics Letters, vol. 34, No. 21, Nov. 1, 2009, pp. 3442-3444, Optics Society of America.

Fercher et al., Measurement of Intraocular Distances by Backscattering Spectral Interferometry, Optics Communication, 117, pp. 43-48, May 15, 1995, Elsevier Science B.V.

Singh et al., Development of a Novel Instrument to Measure the Pulsatile Movement of Ocular Tissues, Experimental eye Research, pp. 1-6, 2010.

Singh et al., Spectral-domain Phase Microscopy With Improved Sensitivity Using Two-dimentional Detector Arrays, Review of Scientific Instruments, 82, pp. 023706-1 to 023706-4, American Institute of Physics.

Bajraszewski et al., Improved Spectral Optical Coherence Tomography Using Optical Frequency Comb, Optics Express, vol. 16, No. 6, pp. 4163-4176, Mar. 12, 2008, Optics Society of America.

Yeh et al., Generation of 10 uJ ultrashort Terahertz Pulses by Optical Rectification, Applied Physics Letters, 90, Apr. 27, 2007, American institute of Physics.

Ropagnol et al., Intense Teraherts Generation at Low Frequencies Using an Interdigitated ZnSe large aperture Photoconductive Antenna, Applied Physics Letters, 103, Oct. 15, 2013, AIP Publishing LLC.

Hirori et al., Single-cycle Terahertz Pulses with Amplitudes Exceeding 1 MV/cm Generated by Optical Rectification in LiNbO3, Applied Physics Letters, 98, Mar. 2, 2011, American Institute of Physics.

Hoffmann et al., THz-pump/THz-probe Spectroscopy of Semiconductors at High Field Strengths, J. Opt. Soc. Am. vol. 26, No. 9, Sep. 2009, pp. A29-A34, Optical Society of America.

Zhiping Jiang and X.-C. Zhang, electro-optic Measurement of THz Field Pulses With a Chirped Optical Beam, Applied Physics Letters, vol. 72, No. 16, Apr. 20, 1998, American Institute of Physics.

Kawada et al. Single-shot Measurement of Terahertz Temporal Waveform Using Pulse-front titlting by a Direct Vision Dispersion Prism, Review of Scientific Instrucments, 80, Nov. 3, 2009, American Institute of Physics.

Kawada et al., Single-shot Terahertz TSpectroscopy Using Pulse-front tilting of an Ultra-short Probe Pulse, Optics Express, vol. 19, No. 12, May 25, 2011, Optical Society of America.

Minami et al., Single-shot Measurement of Terahertz Electric-field Waveform Using a Reflective Echelon Mirror, Applied Physics Letters, 103, Jul. 29, 2013, AIP Publishing LLC.

Cao et al., Frequency-domain Interferometer for Measurement of the Polarization Mode Dispersion in Single-Mode Optical Fibers, Optics Letter, vol. 19, No. 22, Nov. 15, 1994, pp. 1837-1839, Optical Society of America.

Blanchard et al., Generation of 1.5 uJ Single-cycle terahertz Pulses by Optical Rectification From a Large Aperture ZnTe Crytal, Optics Express, vol. 15, No. 20, pp. 13212-13220, Optical Society of America.

Hoffmann et al., Impact Ionization in InSb Probed by Terahertz Pump—Terahertz Probe Spectroscopy, Physical Review B, 79, Apr. 6, 2009, The American Physical Society.

Razzari et al., Nonlinear Ultrafast Modulation of the Optical Absorption of Intense Few-cycle Terhertz Pulses in n-doped Semiconductors, May 7, 2009, The American Physical Society.

Wen et al., Ultrafast Electron Cascades in Semiconductores Driven by Intense Femtosecond Terahertz Pulses, Physical Review, 78, Sep. 10, 2008, The American Physical Society.

Singh et al., Mesure of Ocular Fundus Pulsation in Healthy Subjects Using a Novel Fourier-Domain Optical Coherence Tomography, Investigative Ophthalmology & Visual Science, Nov. 2011, vol. 52, No. 12, pp. 8927-8932, The Association for Research in Vision and Ophthalmology, Inc.

* cited by examiner

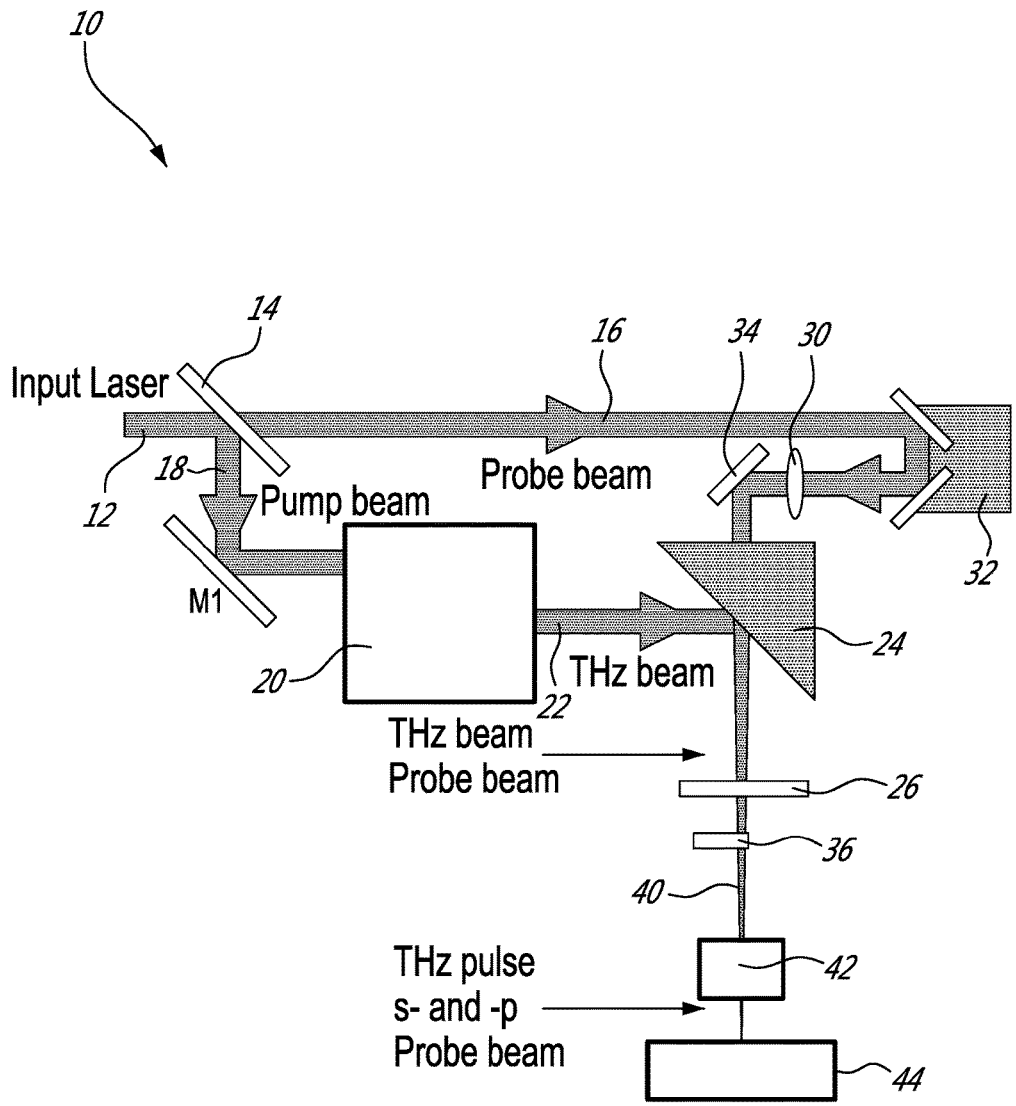

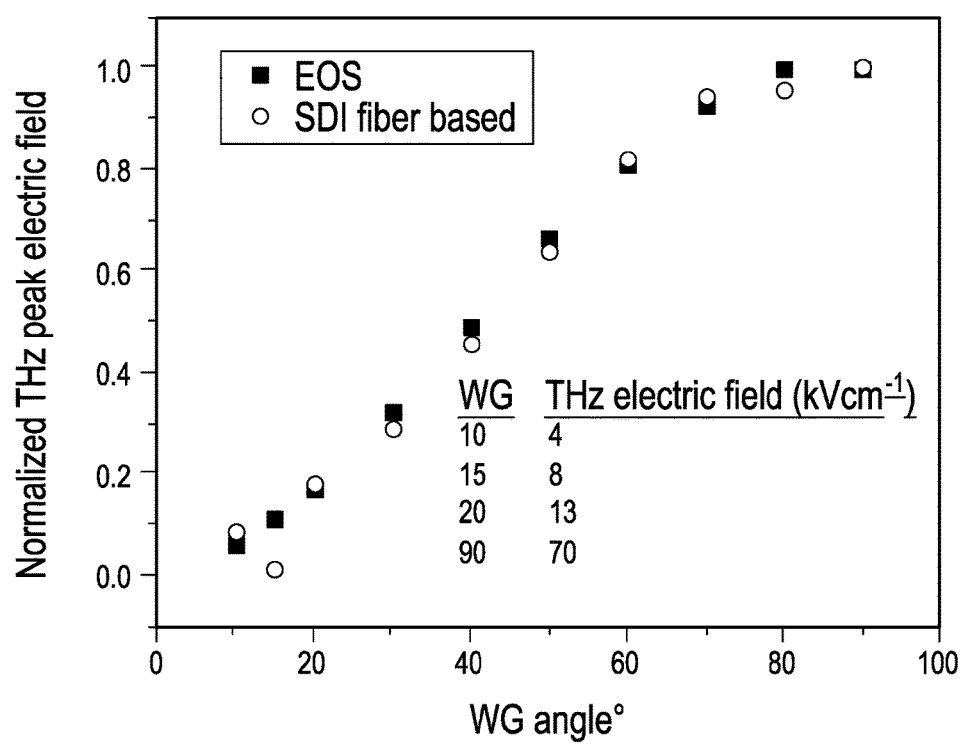

METHOD AND APPARATUS FOR CHARACTERIZATION OF TERAHERTZ RADIATION

CROSS-REFERENCE TO RELATED APPLICATIONS

This application is a National Entry Application of PCT application no PCT/CA2015/051133 filed on Nov. 4, 2015 and published in English as WO 2016/070273 under PCT Article 21(2), which itself claims benefit of U.S. provisional application Ser. No. U.S. 62/076,826, filed on Nov. 7, 2014. All documents above are incorporated herein in their entirety by reference.

FIELD OF THE INVENTION

The present invention relates to terahertz radiation. More specifically, the present invention is concerned with a method and an apparatus for characterization of terahertz radiation.

BACKGROUND OF THE INVENTION

Coherent terahertz (THz) detection methods, such as terahertz time-domain spectroscopy (THz-TDS), allow the spectroscopy of materials without assuming the Kramers-Kronig relation [1]. Since the spectral resolution in terahertz time-domain spectroscopy (THz-TDS) depends on the length of the scan ($\Delta\nu=1/T$), long scanning times are required to achieve high spectral resolution. Various methods, such as photoconductive antennas [2], electro-optic (EO) sampling, air-biased-coherent-detection (ABCD) [3] and spectral domain interferometry (SDI) [4-5] have been demonstrated for measuring the temporal THz electric field profile. Among these methods, the electro-optic (EO) sampling method has become most common due to its simplicity [6].

In electro-optic (EO) sampling, a linearly polarized femtosecond laser pulse co-propagates with a picosecond THz pulse in an electro-optic (EO) crystal. The THz electric field induces birefringence in the crystal, which changes the polarization of the linearly co-propagating laser pulse. The change in the phase between the two polarization components of the probe beam, which is proportional to the THz electric field, can be measured by using a quarter-wave plate and a Wollaston polarizer placed after the detection crystal. In this case, the phase change appears as a modulation in the intensity of the probe beam. The complete THz waveform can be reconstructed by scanning the probe pulse over the entire THz pulse.

Several improvements in electro-optic (EO) sampling have been proposed, such as the chirped-pulse or spectral-encoding method [7], the cross-correlation method [8], the two dimensional THz pulse characterization method with dual echelons [9], and the tilted wavefront detection method using prisms [10].

To obtain high spectral resolution for spectroscopic purposes, a long scanning time is required, which is typically achieved by using thicker detection crystals. If a thin crystal is used, internal reflections from the two surfaces of the crystal interfere with the main detected THz signal, which induces unwanted beating in the measured spectrum.

All the aforementioned THz detection methods based on electro-optic (EO) sampling have used a quarter-wave plate and a Wollaston prism to measure the THz electric field. However, with recent advances in high power THz generation methods, the use of thicker crystals poses a so called "over-rotation" issue. If the THz electric field is high enough to introduce a phase difference of more than 90°, a reversal in the intensity modulation of the detection beam occurs, leading to ambiguities in the measured THz field [11], a situation referred to as "over-rotation". Birefringence introduced in the electro-optic (EO) crystal is proportional to both the THz electric field and the thickness of the crystal. In principle thinner crystals could be used to avoid over-rotation, but thinner crystals cause internal reflection effects, as discussed hereinabove. Moreover, the use of thin crystals reduces the signal-to-noise ratio (SNR) of the measured THz signal, due to the decrease in interaction length.

The air-biased-coherent-detection (ABCD) method [3] does not have the problem of over-rotation, but the need for a high voltage supply makes it more complicated to use when compared with the electro-optic (EO) sampling methods, and the use of plasma for detection is intrinsically unstable.

Therefore, a simple method is yet desirable to satisfy the requirement for measuring intense THz electric fields.

To allow long scans in time, with the goal to improve spectral resolution and to avoid over-rotation for intense THz pulses, a method based on spectral domain interferometry (SDI) has been proposed. In this method, change in the phase difference introduced in the probe beam due to the THz electric field is measured using spectral domain interferometry (SDI).

The spectral domain interferometry (SDI) method has already been used to measure phase changes as small as few micro-radians for various other applications [12]. The spectral domain interferometry (SDI) method not only has the ability to measure intense THz electric fields for spectroscopic purposes with good spectral resolution, but also simplifies the setup by eliminating the need for lock-in amplifiers. It also allows the use of thick detection crystals by solving the problem of over-rotation for high-power THz sources.

Details on the use of spectral domain interferometry (SDI) for measuring small phase changes have been described in previous works [13-15]. Here only a brief overview of this method is given for the sake of completeness. In conventional spectral domain interferometry (SDI), a broadband light source of bandwidth $\Delta\lambda$ centered around $\lambda_0$ is used to illuminate a reference surface and the sample surface in a Michelson interferometer scheme. The reflected signals from the reference and the sample surfaces, with intensities $I_R$ and $I_S$ respectively, are spectrally dispersed over a charged-coupled device (CCD) camera using a grating to yield an interference signal that can be represented by:

$$I(k)=I_R(k)+I_S(k)+2\sqrt{I_R(k)I_S(k)}\cos[\phi_0+2kL] \qquad (1)$$

where $k=2\pi/\lambda$ is the wave vector, $\phi_0$ is a phase constant and L is the optical path difference (OPD) between the reference signal and the sample signal.

The instantaneous phase difference between the reference surface and the sample surface is determined using the following relation:

$$\phi = \arctan\left(\frac{\text{Im}\,(\tilde{I}(L))}{\text{Re}\,(\tilde{I}(L))}\right) \qquad (2)$$

where $\tilde{I}(L)$ is the Fourier transform of relation (1) above.

Thus, any change in the optical path difference over time can be tracked [15] by monitoring the phase change given by relation (2).

A spectral domain interferometry (SDI) detection set up as proposed in PCT patent application WO 2014/019091 is shown in FIG. 1. A beam splitter (BS1) divides a laser beam into a probe beam and a pump beam. The pump beam is used to generate the THz signal. A beam splitter (BS2) divides the probe beam further into two equal parts. The reflected part of the probe beam is sent to a 0.3 mm-thick glass plate. The two surfaces of the glass plate each reflect about 4% of the incident beam. Half of the probe beam that is reflected from the glass plate is transmitted through the beam splitter (BS2). The reflected signal from the glass plate consists of two pulses, a front pulse that is reflected from the front surface, and a back pulse reflected from the back surface of the glass plate. The front pulse and the back pulse are separated by 3 ps, due to the refractive index of 1.5 associated with the glass plate. Using a cylindrical lens (CL1), these two pulses propagate through a hole in an off-axis mirror, and their line-like spatial profile is focused onto a 0.5 mm thick ZnTe detection crystal, overlapping the THz beam. A cylindrical lens (CL2) is used to collimate the probe beam, which is then sent to a spectrometer. A typical custom made spectrometer consists of a grating, with 600 grooves/mm, a cylindrical lens, with a focal length f=100 mm, and a 2D charged-coupled device (CCD) camera (PixeLINK, PL-B953) with 760×1024 pixels.

Using the spectrometer, interference fringes in the spectrum are observed due to the interference between the front and back pulses. In spectral domain interferometry (SDI), the different spectral components of the beam are separated after the diffraction grating, and thus the various spectral components of the probe pulse are not mode locked any more. This is why the interference pattern can be measured over the depth range of the spectral domain interferometry (SDI) method, as determined by the spectrometer used. For a Gaussian profiled spectrum, the depth range can be written as follows:

$$d_{max} = \frac{2\ln 2}{\pi} \frac{N}{2} \frac{\lambda_0^2}{\Delta\lambda} \quad (3)$$

To measure the complete THz pulse, an optical delay line is used to vary the delay between the THz pulse and the optical pulse. The THz pulse is temporally matched with the optical back probe pulse. The delay between the front pulse and the back pulse is large enough, i.e. 3 ps, so that the front pulse can pass through the ZnTe crystal without seeing the THz electric field. The presence of the THz electric field changes the refractive index of the ZnTe crystal via the Pockels effect. The back pulse experiences this change in the refractive index, while the front pulse does not, thus introducing a phase difference between the two optical probe pulses. This phase change between the two optical probe pulses is proportional to the THz electric field. Therefore, the shape of the THz electric field can be reconstructed by changing the delay between the THz and the probe pulse. In the spectral domain interferometry (SDI) method, the change in the phase introduced by the change in the refractive index of the ZnTe crystal is measured, from which the THz electric field can be measured up to the depth range of the spectral domain interferometry (SDI) method.

To reconstruct the THz signal, data from the camera are numerically treated, which involves several intermediate steps. These steps are as follows. The data from the camera, acquired in the wavelength space, are rescaled to the wave vector (k)-space. Then, they are Fourier transformed to obtain the frequency corresponding to the optical path difference between the two signals reflected from the glass plate. The phase difference between these two pulses reflected from the glass plate is measured using Relation (1) above. This phase is tracked over time while changing the delay between the THz signal and the probing signal. The phase waveform gives the waveform of the THz electric field.

The spectral domain interferometry (SDI) method described hereinabove has overcome several problems that exist in other THz detection methods, most notably overrotation and complex setups. However, the scan length is limited by the thickness of the glass plate, which in the system discussed in relation to FIG. 1 was 3 ps, with a glass plate with a thickness of 0.3 mm, whereas there are many cases when longer scans would be necessary to resolve the fine spectrum. As for signal-to-noise ratio (SNR), results of THz electric field measured using spectral domain interferometry (SDI) and electro-optic (EO) sampling show that the signal-to-noise ratio (SNR) is lower with spectral domain interferometry (SDI) than with electro-optic (EO) sampling. This is partially because of vibrations in the experimental environment, which changes the angle between the probe beam and the glass plate, thus introducing noise to the phase. The spectral domain interferometry (SDI) signal is also affected by the strong background near zero optical path difference, which significantly reduces the signal-to-noise ratio (SNR).

It thus appears that conventional THz detection methods, such as electro-optic (EO) sampling and the air-biasedcoherent-detection (ABCD) method for example, suffer from over-rotation effects and/or have a complex configuration, while the more recent spectral domain interferometry (SDI) method discussed hereinabove needs be improved as far as measuring long scans and signal-to-noise ratio (SNR) are concerned.

In the spectral domain interferometry (SDI) method, the scan length can be increased by using a thicker glass plate, whose thickness is within the depth range of the spectral domain interferometry (SDI) system. A Mach-Zehnder-type interferometer configuration can also be used to increase the overlap between the reference and the probe pulse. The signal-to-noise ratio (SNR) can be improved by using a low readout noise camera. The self-referencing method can also be used in the spectral domain interferometry (SDI) detection, where the optical probe beam is focused at the detection crystal in a line-like pattern. This line can be imaged back on to the 2D charged-coupled device (CCD) camera along the vertical direction i.e. perpendicular to the diffraction plane of the grating in the spectrometer. This way, the phase change or the optical path difference measured along the vertical direction of the charged-coupled device (CCD) camera gives the spatial profile of the THz signal.

Thus, as the art stands, in relation to scan length, using a thicker glass plate would increase the scan length, but this would also reduce the signal-to-noise ratio (SNR), due to the larger optical path difference between the two interfering signals [16]. The Mach-Zehnder-type interferometer configurations are more sensitive to vibrations, also resulting in larger noise in the measurement.

In relation to signal-to-noise ratio (SNR), even when using both a low readout noise camera and the self-referencing method in spectral domain interferometry (SDI) detection it is found that the signal-to-noise ratio (SNR) of spectral domain interferometry (SDI) measurements are much lower compared with those of electro-optic (EO) sampling.

There is still a need in the art for a method and system for characterization of terahertz radiation.

SUMMARY OF THE INVENTION

More specifically, in accordance with the present invention, there is provided a method for characterizing terahertz radiation using spectral domain interferometry, comprising overlapping a pump beam and a terahertz beam in a detecting crystal; obtaining two probe pulses by propagating the probe beam into a polarization maintaining single-mode optical fiber after the detecting crystal; and measuring a change in the optical path difference between the two probe pulses.

There is further provided a spectral domain interferometry system for characterizing terahertz radiation, comprising a detection crystal, where a terahertz pulse and a probe beam are made to overlap; a polarization-maintaining optical fiber propagating the probe beam after the detection crystal and outputting two probe pulses; and a spectrometer where the two probe pulses interfere.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 2 is a diagrammatical view of system for THz detection according to an embodiment of an aspect of the present invention;

FIG. 6 shows the dependence of the THz peak electric field on the angle between the two wire-grid polarizers, measured using the present method (dots) and the conventional electro-optic sampling method (squares).

DESCRIPTION OF ILLUSTRATIVE EMBODIMENTS

Figure 1:
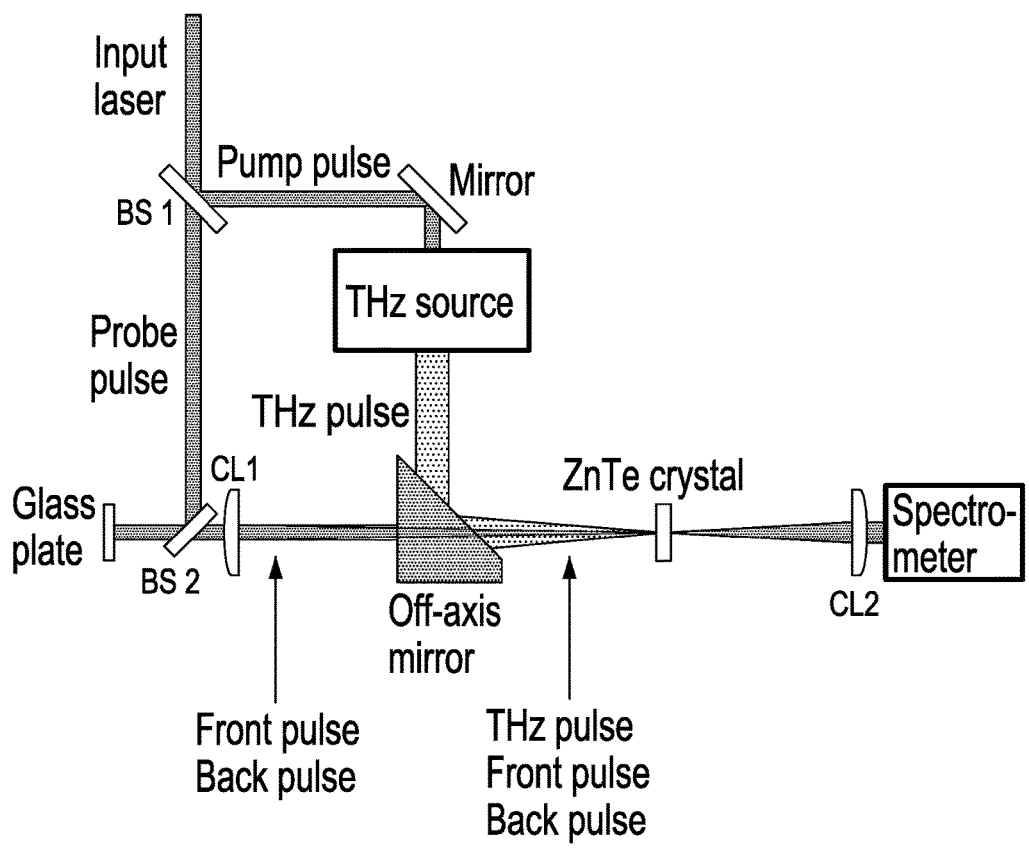
FIG. 1 is a diagrammatical view of a system for THz detection using spectral domain interferometry (SDI), as known in the art.

The present invention is illustrated in further details by the following non-limiting examples.

A system 10 according to an embodiment of an aspect of the present invention is shown in FIG. 2.

A laser beam 12, such as a 800 nm laser beam for example, is split into a pump beam arm 18 and a probe beam arm 16 using a beam splitter 14.

The pump beam arm 18 is used to generate THz radiation in a THz source 20 using optical methods, such as optical rectification in a nonlinear crystal such as a $LiNbO_3$ crystal for example, or four-wave mixing in air plasma for example. A tilted-pulse-front method in a $LiNbO_3$ crystal for example can be used to generate THz radiations with energies up to 0.3 µJ with bandwidth in a range comprised between 0.1 and 3 THz.

The generated few-cycle THz beam 22 is focused using an off-axis parabolic (OAP) mirror 24 onto an electro-optic detection crystal 26.

The optical probe beam arm 16 is focused by a spherical plano-convex lens 30, and then propagates through a hole in the off-axis parabolic (OAP) mirror 24 and to the detection crystal 26, where it overlaps with the focused THz beam 22.

A quarter wave plate 36 is used before a single mode polarization-maintaining optical fiber 40, such as Thorlabs polarization maintaining 780-HP for example, to convert the linear polarization state of the optical probe beam 16 to circular polarization state. Then the optical probe beam 16 is coupled into the polarization-maintaining optical fiber 40, with its polarization direction set along the two orthogonal birefringent axes (x and y) of the polarization-maintaining optical fiber 40. Propagation of the optical probe beam 16 through the polarization-maintaining optical fiber 40 results in an intrinsic optical path difference between the two orthogonal polarization components of the optical probe beam 16, due to the birefringence in the fiber. As a result, two pulses are created at the exit of the polarization-maintaining optical fiber 40 with temporal separation between them. A polarizer 42 is placed at the end of polarization-maintaining optical fiber 40 with its transmission axis at 45° with respect to the axes (x and y) of the polarization-maintaining optical fiber 40. By allowing the component of each polarization state, i.e. fast and slow, to pass through the polarizer 42, two pulses with a temporal delay between them, and with the same linear polarization, are generated. The optical probe beam 16 is then sent to a spectrometer 44 that is used to observe the interference fringes due to the interaction between the fast and slow pulses.

A custom-made spectrometer consisted of a diffraction grating (600 grooves/mm), a plano-convex cylindrical lens (f=150 mm), and a two-dimensional (2D) charged-coupled device (CCD) camera (Dalsa Inc. 480×640 pixels). At the charged-coupled device (CCD) camera, the fast and slow pulses interfere, thus allowing measuring the phase difference between them.

The THz pulse is aligned in a polarization state vertical to the paper plane and parallel to the optical probe beam 16 polarization state at the ZnTe detection crystal 26. The presence of the THz electric field induces birefringence in the ZnTe detection crystal 26 via the Pockels effect. This birefringence is detected by the optical probe beam 16 as a change in the optical path difference (OPD) between the two orthogonal signals generated by the polarization-maintaining optical fiber 40.

Therefore, the change in the phase difference introduced by the THz pulse can be measured using the interference of the two signals. When there is no THz radiation reaching the detection crystal 26, this measured phase difference between the two signals is proportional to the length of the polarization maintaining optical fibre 40, and defines a reference phase difference. When a THz radiation reaches the detection crystal 26, the THz electric field induces birefringence in the electro-optic crystal 26 due to the Pockels effect, which affects the probe pulse, which is temporally matched with the THz pulse, and an extra phase difference is introduced between the two signals formed after the detecting crystal 26, compared to the reference phase difference, and this extra phase difference is directly proportional to the THz electric field. By delaying the probe beam 16 using a delay stage 32 the temporal shape of the THz pulse can thus be reconstructed.

The detection crystal 26 may be an electro-optic crystal, such as ZnTe, GaP and GaSe for example, with a typical thickness less than a few mm, typically between 10 µm to 2 mm.

In order to reconstruct the THz signal, the data from the camera of the spectrometer 44 are numerically treated, involving some intermediate steps, as follows. First, the data from the camera of the spectrometer which are acquired in the wavelength space are rescaled in the wave vector (k)-space. These data are then Fourier transformed to obtain the frequency corresponding to the optical path difference (OPD) between the two s and p components. The phase between the s and p components is determined using relation (2) above. This phase is tracked over time by changing the delay between the THz signal and the probe signal. The phase waveform gives the waveform of the THz signal.

More precisely, the resulting interference between the two signals at the charged-coupled device (CCD) camera can be expressed using a relation adapted from relation 1) reported hereinabove:

$$I(k) = I_P(k) + I_S(k) + 2\sqrt{I_P(k)I_S(k)} \cos[\emptyset_o + kL] \quad (4)$$

where $k = 2\pi/\lambda$ is the wave number, $I_F$ is the fast axis signal intensity, $I_S$ is the slow axis signal intensity, $\emptyset_o$ is the phase constant, and L is the optical path difference between the fast and the slow axis signals. The interference is recorded using a CCD camera and rescaled from wavelength space to wave-number (k) space and Fourier transformed to obtain the corresponding fast Fourier transform spectrum. The instantaneous phase difference between the two signals is calculated using the relation 2) discussed hereinabove:

$$\phi = \tan^{-1}\left[\frac{\text{Im}(\tilde{I}(L))}{\text{Re}(\tilde{I}(L))}\right] \quad (2)$$

where $\text{Im}(\tilde{I}(L))$ is the imaginary part and $\text{Re}(\tilde{I}(L))$ is the real part of the Fourier transform of relation (4) for an optical path difference equal to L, corresponding to the optical path difference introduced to the fast and slow signals by the polarization maintaining optical fiber. The change in optical path difference (OPD) over time can be traced by monitoring the phase change in relation (2). This phase change is proportional to the THz electric field. Hence the temporal shape of the THz electric field can be reconstructed by varying the delay time between the THz pulse and the optical probe beam pulse by using the delay stage.

Figure 3A:
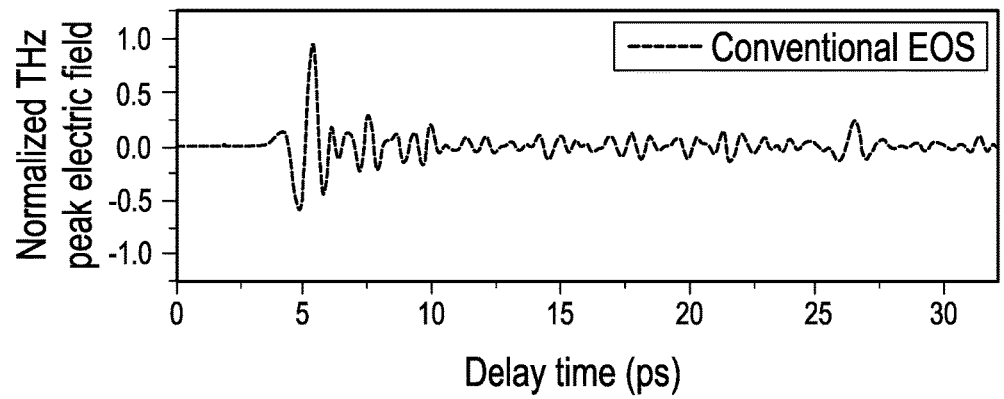
FIG. 3A shows a THz electric field trace recorded using a conventional electro-optic sampling system and method.

The traces of the THz electric fields measured using the present system, with an optical fiber having parameters as shown in Table 1 below for example on the one hand, and the conventional electro-optic sampling method on the other hand, are shown in FIG. 3.

TABLE I

| Numerical Aperture | 0.12 |
| --- | --- |
| Attenuation | ≤4 dB/km @ 850 nm |
| Operating Wavelength | 770-1100 nm |
| Second Mode Cut-off | 710 ± 60 nm |

TABLE I-continued

| Mode Field Diameter (1/e² fit - near field) | 5.3 ± 1.0 µm @ 850 nm |
| --- | --- |
| Beat Length | 2.4 mm @ 850 nm |
| Birefringence | 3.5 × 10⁻⁴ |

Figure 3B:
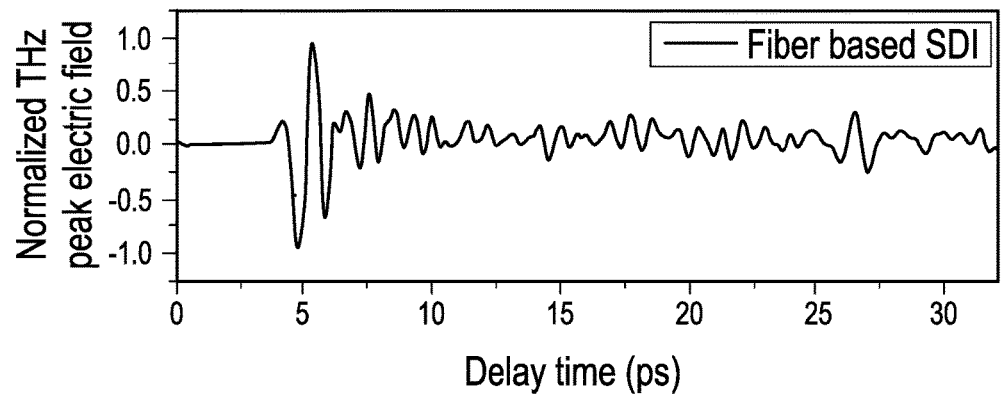
FIG. 3B shows a THz electric field trace recorded using a system and method according to the present invention.

The trace in FIG. 3B is obtained using an optical fiber length of 80 cm. At that length, the two signals have an optical path difference of 400 µm, i.e. a temporal separation of 1.33 ps, between them at the exit end of the fiber. It can be seen that the temporal scan length has been extended by more than ten times compared to the Michelson based spectral domain interferometry (SDI) method reported in previous works (see WO 2014/019091), where the scan length of the THz signal that could be measured was limited by the thickness of the glass plate in use (300 µm), resulting in a scan window of 3 ps. This limitation is here overcome.

Figure 4:
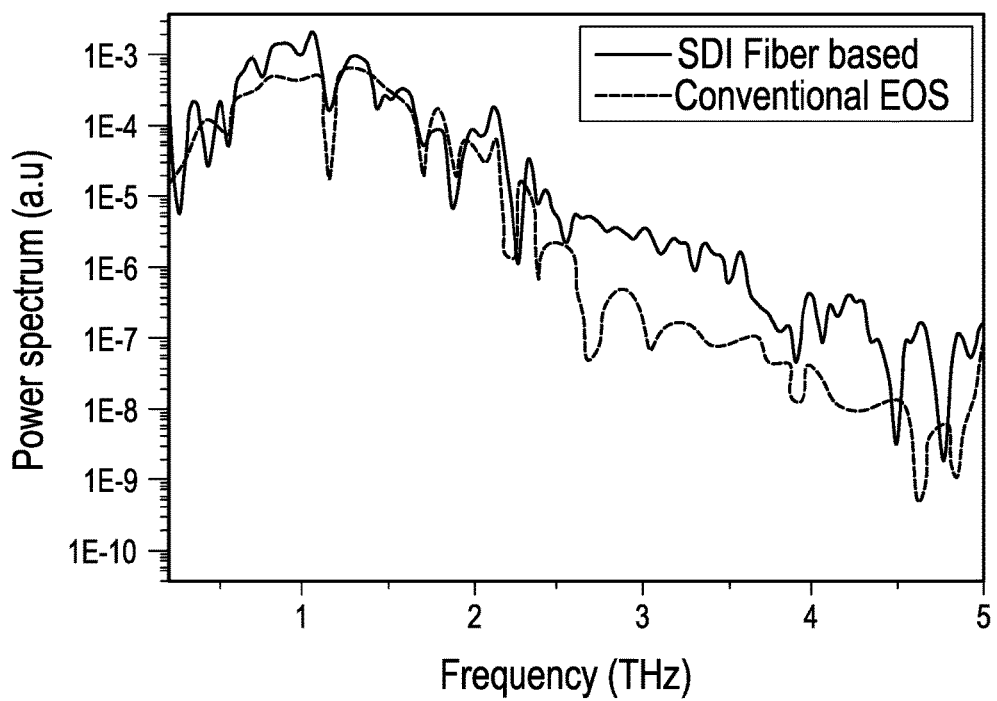
FIG. 4 show spectra of THz pulses measured using a method of the present invention (continuous line) and a conventional electro-optic sampling system and method (dotted line)

The corresponding power spectra for the THz electric field traces are shown in FIG. 4. Using the present fiber based spectral domain interferometry (SDI) method, a signal-to-noise ratio (SNR) of 43,000 in the power spectrum was measured, compared to 110,000 with the conventional electro-optic sampling method. Compared with the Michelson based spectral domain interferometry (SDI) method, the present fiber based spectral domain interferometry (SDI) method results in an enhancement of the signal-to-noise ratio (SNR) by more than four times.

Figure 5:
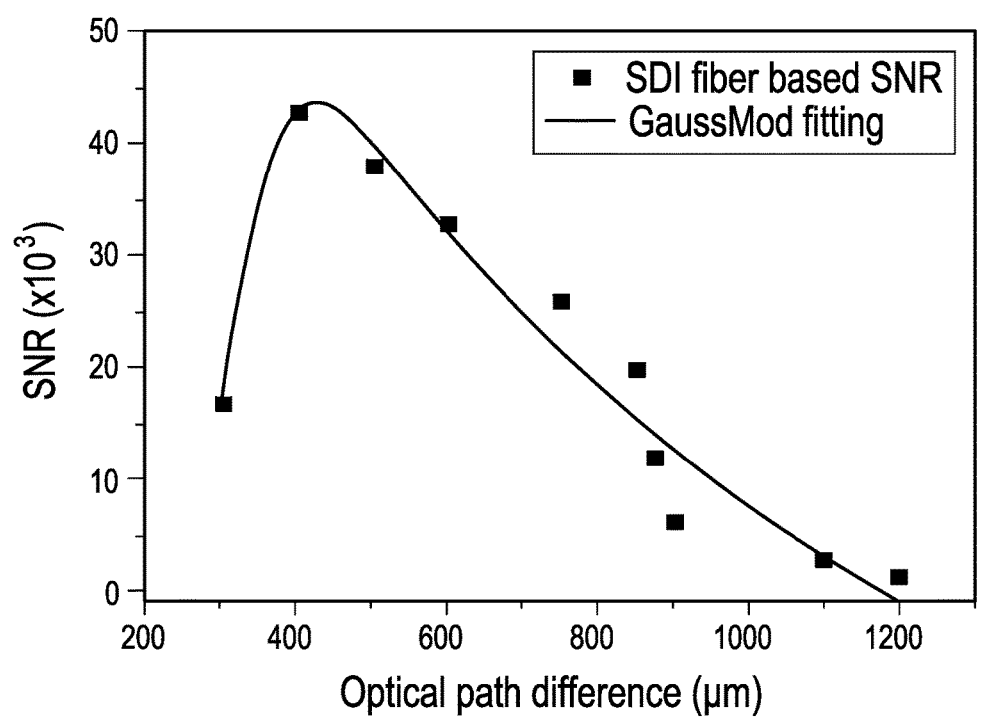
FIG. 5 shows signal-to-noise ratio (SNR) of the THz electric field measurements dependence on optical path difference (OPD) between the two signals at the exit end of the optical fiber.

In the search for an optimal fiber length that yields better signal-to-noise ratio (SNR) in spectral domain interferometry (SDI) THz detection, different fiber lengths were tried, from 60 to 240 cm, with corresponding optical path difference (OPD) between the signals at the exit end of the fiber between 300 and 1200 µm. FIG. 5 shows the signal-to-noise ratio (SNR) measured using the present fiber based spectral domain interferometry (SDI) method using various fiber lengths. It was found that the signal-to-noise ratio (SNR) increases as the optical path difference (OPD) between the interfering signals decreases from 1200 µm to 400 µm. However, decreasing the optical path difference (OPD) from 400 µm to 300 µm reduced the signal-to-noise ratio (SNR). One could attribute this reduction in the signal-to-noise ratio (SNR) to the fact that for the spectral domain interferometry (SDI) method, working very close to the dc component of the interference signal results in the signal subject to many low-frequency noises in a laboratory environment, thus reducing signal-to-noise ratio (SNR) of THz detection.

Based on the experimental findings of FIG. 5, one can attribute the enhancement in the signal-to-noise ratio (SNR) obtained, compared with the Michelson based spectral domain interferometry (SDI) method, to the fact that the optical path difference (OPD) between the signals could be small (400 µm) in the case of the fiber-based spectral domain interferometry (SDI) method, while the optical path difference (OPD) between the signals in the case of the Michelson based spectral domain interferometry (SDI) method was relatively large (900 µm). Other possible reason for the signal-to-noise ratio (SNR) enhancement of the fiber-based method is the elimination of angular vibrations in the glass plate those have been encountered in the case Michelson based spectral domain interferometry (SDI), thus reducing the noise due to those vibrations and accordingly yields an overall better signal-to-noise ratio (SNR) in the case of spectral domain interferometry (SDI) fiber based method.

Furthermore, in order to study the capability of the present method in measuring different THz fields, the THz electric field has been varied from about 4 kV/cm to about 70 kV/cm by rotating the angle between the two wire-grid polarizers.

The results are shown in FIG. 6, where the THz fields measured using the fiber-based spectral domain interferometry (SDI) method are compared with the THz fields measured using the conventional electro-optic sampling method. A good agreement between the two methods is evident, suggesting that the present method is a promising method for measuring lower THz electric fields as well.

Thus a polarization-maintaining optical fibre (PMF) is used as the active component for detecting THz radiation, which also solves the problem of scan length and signal-to-noise ratio (SNR). By using sufficiently long polarization-maintaining fibres, the scan length can be extended to values much larger than 3 ps. The optimum length of the fibre is determined by its dispersion, which may vary depending on the fibre type. The signal-to-noise ratio (SNR) is also greatly improved by replacing free-space optics with fibres, and also by shifting the signal to be measured outside of the strong background near zero optical path difference (OPD).

There is thus provided a method and a system for terahertz (THz) electric field measurement based on spectral-domain interferometry (SDI) and using a polarization maintaining single-mode optical fiber in the optical probe beam line. The polarization maintaining optical fiber is placed after the detection crystal, and is used to increase the phase difference between the two polarizations states of the optical probe beam that is required in the spectral-domain interferometry (SDI) method. It was shown that the signal-to-noise ratio (SNR) van be enhanced by more than four times compared with previously reported Michelson based spectral domain interferometry (SDI) method. Moreover, the scanning time of the THz pulse has been extended to >30 picoseconds.

Furthermore, the present system and method have the potential to allow THz measurement of modest-intensity, oscillator-based THz sources, and not just intense THz sources. This is because the spectral domain interferometry (SDI) signal to be measured can be shifted outside of the noisy background near zero optical path difference (OPD), thus allowing smaller phase shifts to be measured with higher signal-to-noise ratio (SNR). This is of high commercial significance, since even though intense THz sources are becoming more and more accessible, most of the THz spectroscopy experiments are still performed using oscillator-based THz systems. The added ability to provide a new detection method for this larger THz community may significantly increase the interest for commercialization.

To overcome the limitation of scan length and signal-to-noise ratio (SNR) at the same time, a method based on spectral domain interferometry (SDI) is provided, where a polarization-maintaining fibre is used instead of a glass plate to get the two pulses.

The scope of the claims should not be limited by the embodiments set forth in the examples, but should be given the broadest interpretation consistent with the description as a whole.

REFERENCES

1. B. B. Hu and M. C. Nuss, Opt. Lett. 20, 1716 (1995).
2. S. Kono, M. Tani, P. Gu and K. Sakai, Appl. Phys. Lett. 77, 4104 (2000).
3. X. Lu and X.-C. Zhang, Appl. Phys. Lett. 98, 151111 (2011).
4. Gargi Sharma, Kanwarpal Singh, Ibraheem Al-Naib, Roberto Morandotti, and Tsuneyuki Ozaki, Opt. Lett. 37, 4338 (2012).
5. Gargi Sharma, Kanwarpal Singh, Akram Ibrahim, Ibraheem Al-Naib, Roberto Morandotti, Francois Vidal, and Tsuneyuki Ozaki, Opt. Lett. 15, 2705 (2013).
6. Q. Wu and X.-C. Zhang, Appl. Phys. Lett. 67, 3523 (1995).
7. Z. Jiang and X.-C. Zhang, Opt. Lett. 23, 1114 (1998).
8. S. P. Jamison, J. Shen, A. M. MacLeod, W. A. Gillespie and D. A. Jaroszynski, Opt. Lett. 28, 1710 (2003).
9. K. Y. Kim, B. Yellampalle, A. J. Taylor, G. Rodriguez and J. H. Glownia, Opt. Lett. 32, 1968 (2007).
10. Y. Kawada, T. Yasuda, H. Takahashi and S.-I. Aoshima, Opt. Lett. 33, 180 (2008).
11. J. Fletcher, Opt. Express 10, 1425 (2002).
12. J. Zhang, B. Rao, L. Yu and Z. Chen, Opt. Lett. 34, 3442 (2009).
13. A. F. Fercher, C. K. Hitzenberger, G. Kamp and S. Y. EI-Zaiat, Optics Commun. 117, 43 (1995).
14. K. Singh, C. Dion, S. Costantino, M. Wajszilber, M. R. Lesk and T. Ozaki, Exp. Eye Res. 91, 63 (2010).
15. K. Singh, C. Dion, M. R. Lesk, T. Ozaki and S. Costantino, Rev. Sci. Instrum. 82, 023706 (2011).
16. T. Bajraszewski, M. Wojtkowski, M. Szkulmowski, A. Szkulmowska, R. Huber and A. Kowalczyk, Opt. Express 16, 4163 (2008).

The invention claimed is:

1. A method for characterizing terahertz radiation using spectral domain interferometry, comprising:
    overlapping a probe beam and a terahertz beam in a detecting crystal;
    obtaining two probe pulses by propagating the probe beam into a polarization maintaining single-mode optical fiber after the detecting crystal; and
    measuring a change in the optical path difference between the two probe pulses.

2. The method of claim 1, comprising, before said overlapping the probe beam and the terahertz beam in the detecting crystal:
    splitting an input broadband light beam into the pump beam and the probe beam; and
    using the pump beam to generate the terahertz beam in a terahertz source.

3. The method of claim 1, comprising, before said propagating the probe beam into the polarization maintaining single-mode optical fiber, converting a linear polarization state of the probe beam to a circular polarization state.

4. The method of claim 1, wherein the probe beam is coupled into the polarization-maintaining optical fiber, with a polarization direction thereof set along the birefringent axes of the polarization-maintaining optical fiber.

5. The method of claim 1, to wherein said obtaining two probe pulses further comprises passing the two pulses exiting the polarization-maintaining optical fiber to a polarizer.

6. The method of claim 1, to wherein said obtaining two probe pulses further comprises passing the two pulses exiting the polarization-maintaining optical fiber to a polarizer, the polarizer being positioned with a transmission axis thereof at 45° with respect to the birefringent axes of the polarization-maintaining optical fiber.

7. The method of claim 1, wherein said measuring a change in the optical path difference between the two probe pulses comprises observing interferences between the two probe pulses.

8. The method of claim 1, comprising, before said overlapping the probe beam and the terahertz beam in the detecting crystal:
    splitting an input broadband light beam into the pump beam and the probe beam; and using the pump beam to generate the terahertz beam in a terahertz source by one of: i) an optical method and ii) four-wave mixing.

9. The method of claim 1, comprising, before said overlapping the probe beam and the terahertz beam in the detecting crystal:
splitting an input broadband light beam into the pump beam and the probe beam; and
using the pump beam to generate the terahertz beam in a THz source by optical rectification in a nonlinear crystal.

10. The method of claim 1, further comprising delaying the probe beam.

11. A spectral domain interferometry system for characterizing terahertz radiation, comprising:
a detection crystal, where a terahertz pulse and a probe beam are made to overlap;
a polarization-maintaining optical fiber propagating the probe beam after said detection crystal and outputting two probe pulses; and
a spectrometer where the two probe pulses interfere.

12. The system of claim 11, further comprising:
an input broadband light beam;
a beam splitter splitting said input beam into a pump beam and the probe beam; and
a terahertz source;
wherein the pump beam is used to generate the terahertz pulse in said terahertz source.

13. The system of claim 11, further comprising a quarter-wave plate before said polarization-maintaining optical fiber to convert a linear polarization state of the probe beam to a circular polarization state.

14. The system of claim 11, wherein a polarization direction of the probe beam is set along the birefringent axes of the polarization-maintaining optical fiber.

15. The system of claim 11, further comprising a polarizer after said polarization-maintaining optical fiber.

16. The system of claim 11, wherein said terahertz source is a non-linear crystal.

17. The system of claim 11, wherein said terahertz source is one of: ZnTe, GaP and GaSe.

18. The system of claim 11, wherein said terahertz source is a four-wave mixing unit.

19. The system of claim 11, wherein said terahertz source is a non-linear crystal of a thickness in a range between 10 micrometers and 2 millimeters.

20. The system of claim 11, further comprising an optical delay line used to match the probe beam in space and time with the terahertz pulse.

* * * * *